United States Patent
Guyatt et al.

(10) Patent No.: US 11,369,230 B2
(45) Date of Patent: Jun. 28, 2022

(54) CLOSED FOOD PROCESSOR OR BLENDER WITH A MECHANISM TO OPEN THE CONTAINER TO ATMOSPHERE

(71) Applicant: Sunbeam Corporation Pty Ltd, Botany (AU)

(72) Inventors: Maxim Guyatt, Botany (AU); Timothy Edward Gulliver, Botany (AU); Sam Kellahan, Botany (AU)

(73) Assignee: Sunbeam Corporation Pty Ltd

( * ) Notice: Subject to any disclaimer, the term of this patent is extended or adjusted under 35 U.S.C. 154(b) by 27 days.

(21) Appl. No.: 16/605,980

(22) PCT Filed: Apr. 13, 2018

(86) PCT No.: PCT/AU2018/050334
§ 371 (c)(1),
(2) Date: Oct. 17, 2019

(87) PCT Pub. No.: WO2018/191773
PCT Pub. Date: Oct. 25, 2018

(65) Prior Publication Data
US 2021/0137314 A1    May 13, 2021

(30) Foreign Application Priority Data
Apr. 19, 2017 (AU) ................ 2017901428

(51) Int. Cl.
*A47J 43/046* (2006.01)
*A47J 43/07* (2006.01)

(52) U.S. Cl.
CPC ......... *A47J 43/046* (2013.01); *A47J 43/0716* (2013.01); *A47J 43/0766* (2013.01); *A47J 43/0772* (2013.01)

(58) Field of Classification Search
CPC .. A47J 43/046; A47J 43/0716; A47J 43/0766; A47J 43/0772; A47J 43/07;
(Continued)

(56) References Cited

U.S. PATENT DOCUMENTS 1,094,712 A * 4/1914 Gale ................. A47J 43/27
220/568
3,856,138 A * 12/1974 Maekawa .......... B65D 81/3222
206/221

(Continued)

FOREIGN PATENT DOCUMENTS

CN    203468415 U    3/2014
WO    2015137981 A1   9/2015

OTHER PUBLICATIONS

International Search Report and Written Opinion dated May 8, 2018.

*Primary Examiner* — David L Sorkin
*Assistant Examiner* — Noor F Ahmad
(74) *Attorney, Agent, or Firm* — Husch Blackwell LLP

(57) ABSTRACT

A food processing system is provided including a vessel assembly, blade assembly, and a motor base. The elements of the system cooperate such that upon assembly of the system, and during use, the volume defining the food processing container is open to atmosphere. Potentially harmful heated air can thus be vented from the food processing container to decrease the likelihood of injury to an operator, both during operation and after operation.

19 Claims, 17 Drawing Sheets

(58) Field of Classification Search
CPC ...... B01F 2215/0026; B01F 2215/0014; B01F 15/00779; B01F 13/047; B01F 2101/1805; B01F 2101/06; B01F 35/45; B01F 35/6052
USPC .......................................... 366/197, 199, 204
See application file for complete search history.

(56) References Cited

U.S. PATENT DOCUMENTS

| | | |
|---|---|---|
| 2016/0220071 A1 | 8/2016 | Hewitt et al. |
| 2017/0245688 A1* | 8/2017 | Hewitt ................. A47J 43/0722 |
| 2018/0140137 A1* | 5/2018 | Barnard ................. A47J 43/042 |
| 2020/0029741 A1* | 1/2020 | Liu ..................... A47J 43/0761 |
| 2020/0060480 A1* | 2/2020 | Zhu ..................... A47J 43/085 |

* cited by examiner

CLOSED FOOD PROCESSOR OR BLENDER WITH A MECHANISM TO OPEN THE CONTAINER TO ATMOSPHERE

BACKGROUND OF THE INVENTION

Food processing and blending systems are commonly used to process and blend food and drink alike. Of late, there has been an increase in popularity of personal blenders, "blend and go" products, and blenders and processors that heat up and cook the ingredients while blending. Many food processor and blender appliances can operate effectively with hot or cold foods and/or liquids. There are also many such appliances that offer other features, including a sealed container either during processing or afterwards (e.g., for storage or travelling with the processed food stuff or liquid for "on the go" consumers).

However, a sealed processing container can present certain problems for food processor- or blender-like appliances. During processing of hot or cold ingredients, the temperature within the device can change considerably. For example, when hot foods or liquids are put into a sealed container, the air inside the container is heated. This can create an increase in the pressure within the container if sealed. A secondary effect is that the temperature at which the liquid inside the vessel boils will actually increase due to the increased pressure. This can be dangerous for numerous reasons.

If the pressure in the vessel increases to a point beyond which the container can handle, the container can rupture and go through "explosive decompression." In addition, if a user opens the container, the lid or blade-set can come off more quickly than expected due to the added pressure. Liquid inside may then boil off rapidly due to the fast decrease in pressure, which can cause the liquid to spontaneously splash out of the container opening.

SUMMARY OF INVENTION

In one aspect there is provided a food processor comprising: an open ended vessel assembly comprising: an outer vessel having an open end and a closed end, and including at least one vent opening; and an inner vessel having an open end and a closed end and being configured to nest within the outer vessel in releasable engagement therewith; a vent hole defined in the inner vessel in the region of the closed end thereof; valve arrangement operable to open and close the vent hole; a blade assembly selectively engageable with the open end of the vessel assembly to close off the inner vessel; and a base selectively engageable with at least one of the vessel assembly and the blade assembly, wherein upon engagement thereof, the valve arrangement is opened such that the vent hole is exposed to atmosphere via the at least one opening of the outer vessel and heated air generated during operation of the base and blade assembly may be vented to atmosphere; and wherein upon disengagement of the vessel assembly from the base or blade assembly, the valve arrangement closed to seal the vent hole such that blended product does not leak from the upright inner vessel.

A food processing system is provided that upon assembly, and during use, has an interior cavity or volume that is vented to atmosphere. Thus, potentially harmful heated air can be vented from the food processing container to decrease the likelihood of injury to an operator, both during operation and after. In an example embodiment, the food processing system includes two blender vessels that form a vessel assembly when engaged with one another, a blade assembly, and a motor base.

The two blender vessels may include an inner vessel and an outer vessel, which are generally similar in shape. Each preferably has an open end, such that the inner vessel fits into the outer vessel through the open end of the outer vessel. The outer vessel may be selectively engageable with the inner vessel, preferably threadingly engageable with the inner vessel. The outer vessel preferably has a closed end opposite its open end. The inner vessel preferably also has a closed end opposite its open end, but the closed end of the inner vessel preferably includes a vent hole with a valve arrangement. The outer vessel preferably acts upon the valve arrangement to seal it when the inner vessel is engaged with the outer vessel, but neither are engaged with the motor base. In this position, the inner vessel can retain liquids therein, and no food or liquid will leak from the bottom. Preferably, the food processor comprises a valve arrangement communicating between the engaged inner and outer vessel in the region of the closed ends thereof. The valve arrangement may be actuable between an open position and a closed position in response to the closed ends of the inner and outer vessels moving away from or towards one another. Alternatively, the valve arrangement may be actuable between an open position and a closed position in response to the inner and outer vessels rotating relative to one another. The valve arrangement may include a hollow plug fixed within the vent hole in the closed end of the inner vessel and a projection extending from an inner face of the outer vessel for selectively opening and closing the plug as the closed ends of the vessels are moved respectively towards or away from one another. Alternatively, the valve arrangement may comprise a moveable plug member extending through an aperture in the closed end of the inner vessel and having a head biased into a closed position, wherein movement of the closed ends of the vessels towards one another results in the head of the plug being moved into an open position.

The open end of the inner or outer vessel may be selectively engageable with a blade assembly, preferably threadingly and sealingly engageable with the blade assembly. Alternatively, the inner and outer vessels may be engagable with one another in a snap fit or with a bayonet fitting. When the blade assembly is attached to the inner vessel, a seal may be created between the blade assembly and the inner blender vessel.

The vessel assembly with the blade assembly attached may be inverted such that the blade assembly is now at the bottom of the blending container. Preferably all food stuff and liquid would therefore be in contact with blades of the blade assembly. The vessel and blade assembly may then be engaged with the motor base. Engaging of the vessel and blade assembly with the motor base may cause motion of the outer vessel relative to the inner vessel (or vice versa). The inner vessel and the base may be complementally splined, and the outer vessel and base may be engageable for limited rotation via a bayonet fitting, preferably a pitched bayonet fitting. This relative motion may cause the outer vessel to cease acting upon the valve arrangement, thereby opening the valve arrangement. Movement of the outer and inner vessels towards or away from one another acts upon the valve arrangement to seal the inner vessel when the inner vessel is engaged with the outer vessel, but neither are engaged with the motor base, such that the inner vessel can retain liquids therein, and no food or liquid will leak from the closed end thereof. A cavity formed between the inner vessel and outer vessel may form a sort of pathway to atmospheric. In an example embodiment, the motor will operate only when the vessel and blade assembly is fully engaged with the motor base (causing the valve to open). A safety mechanism such as an interlock may assist with ensuring the valve is open prior to initiate the blending process.

DETAILED DESCRIPTION OF THE EMBODIMENTS

Figure 1:
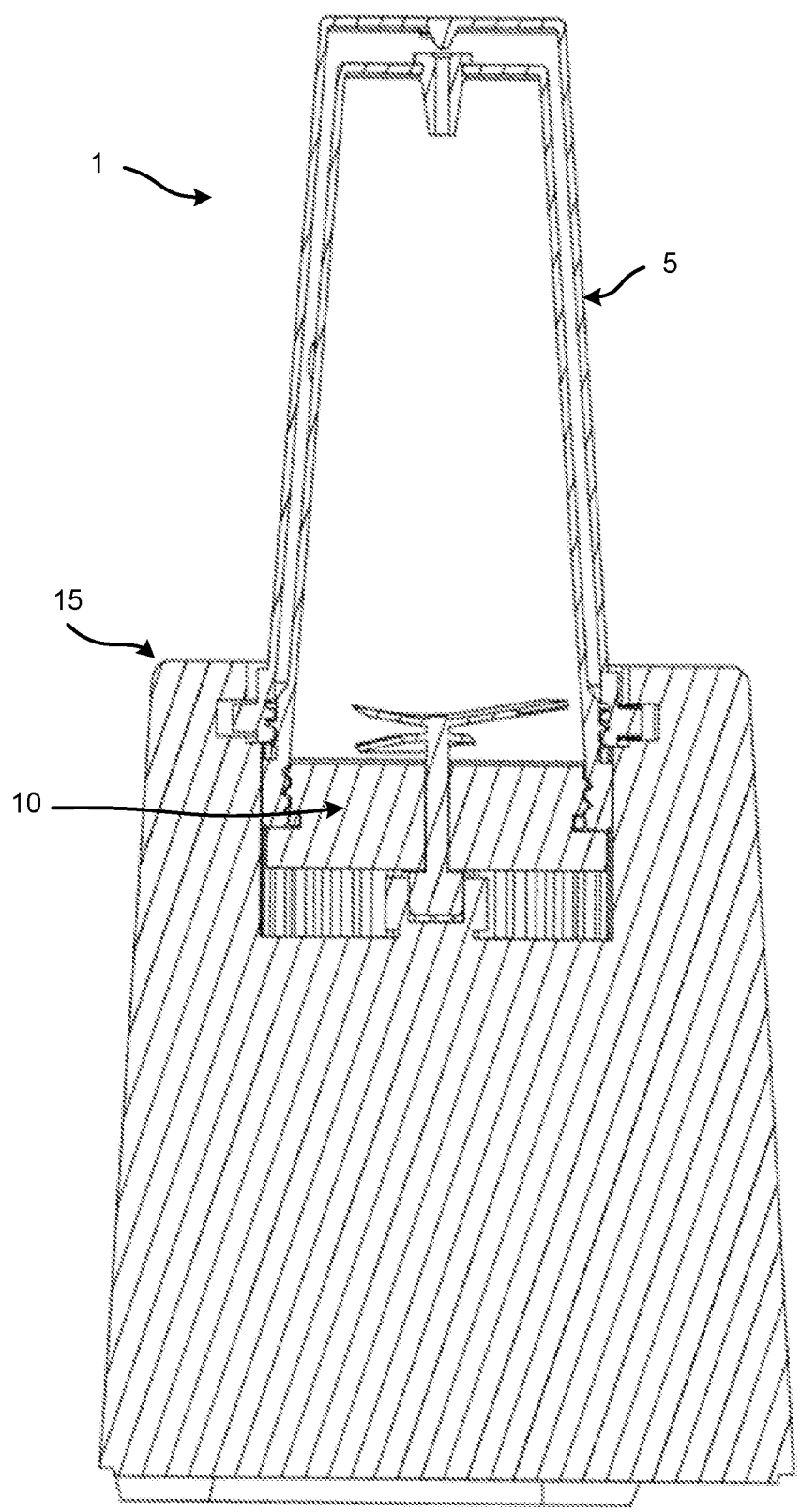
FIG. 1 is a cross-sectional view of a food processor with a mechanism to open a vessel assembly of the food processor to atmosphere constructed according to the teachings of the present invention.

The present disclosure is directed to a food processor or blender 1 that includes a mechanism to vent a vessel assembly of the food processor to atmosphere during food or liquid blending. As shown in FIG. 1, the food processor 1 includes a vessel assembly 5 that is shown its inverted position. In its inverted position, the vessel assembly 5 is engaged with a blade assembly 10. The blade assembly 10 operates to blend or process food or liquid items contained within the vessel assembly 5. The blade assembly 10 and/or vessel assembly 5 is further engaged with a motor base 15. Preferably the base 15 includes various electronics as known and understood in the art to power the blade assembly 10, as well as to allow the food processor 1 to sit on a table, counter, or other substantially flat surface.

Figure 2:
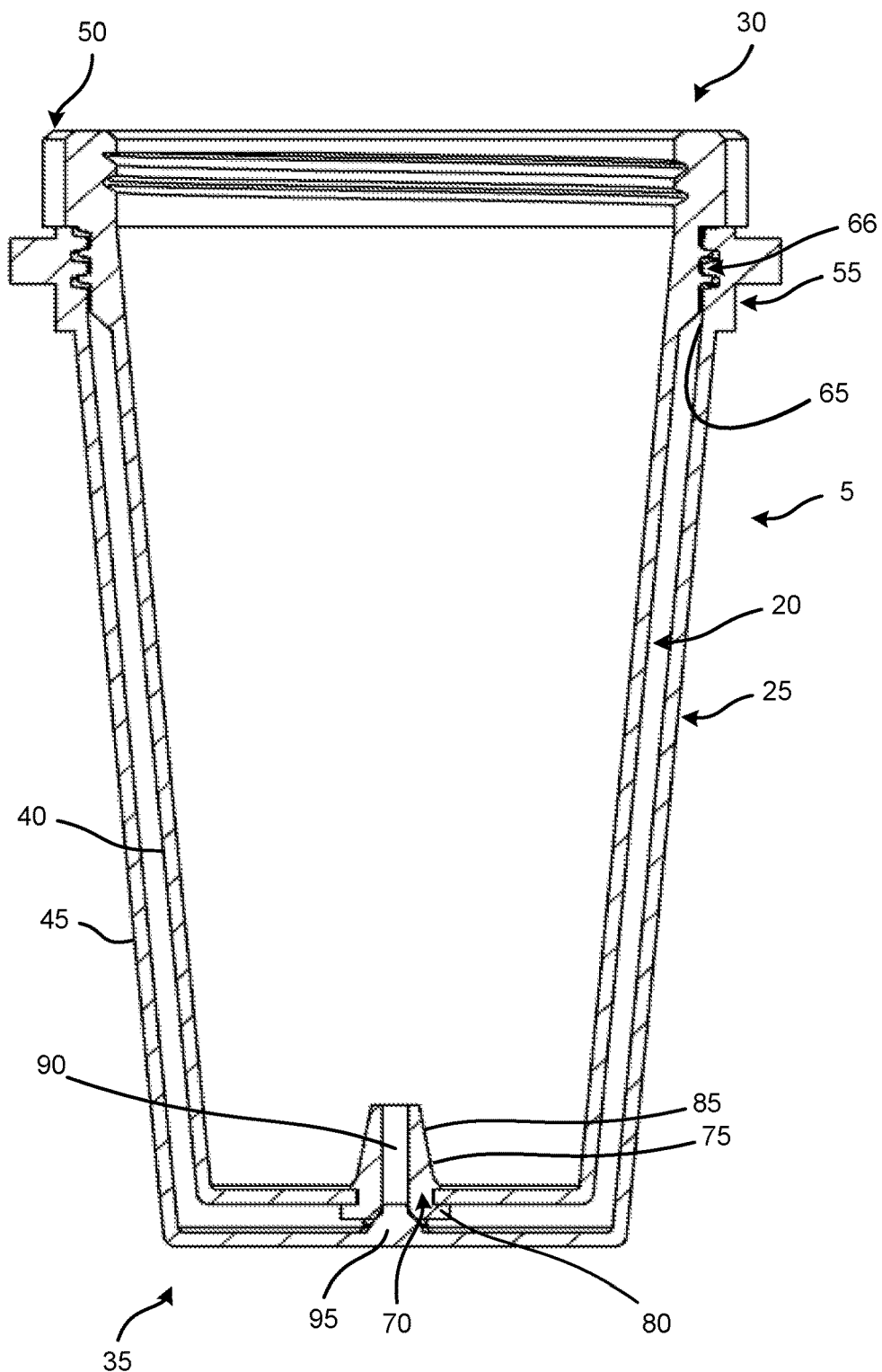
FIG. 2 is a cross-sectional view of the vessel assembly of the food processor in FIG. 1.
Figure 3:
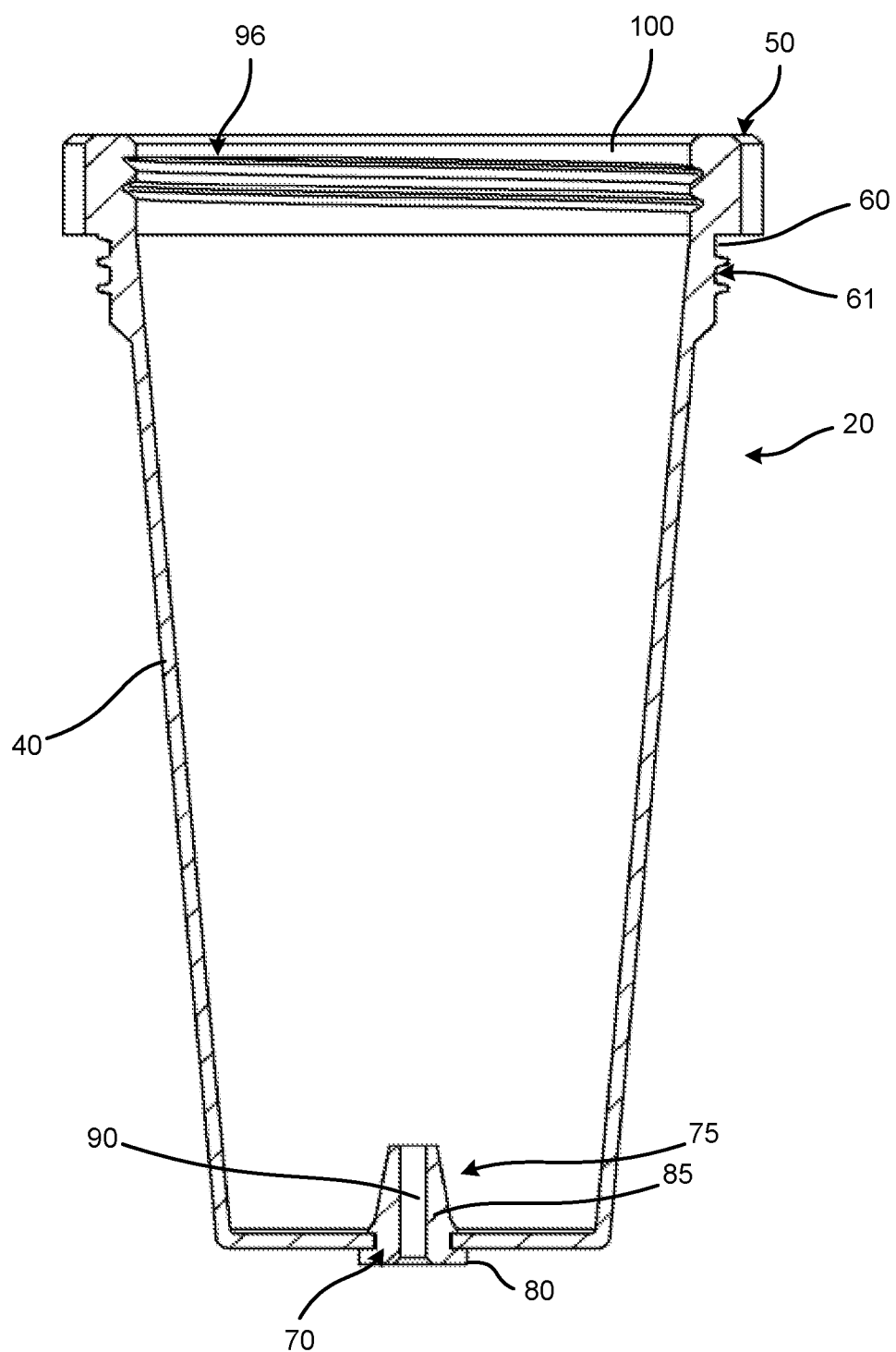
FIG. 3 is a cross-sectional view of an inner vessel of the vessel assembly of FIG. 2.

Turning to FIG. 2, the vessel assembly 5 is shown in its normal orientation. The vessel assembly 5 includes each of an inner vessel 20 and an outer vessel 25. The inner vessel 20 is shown in greater detail in FIG. 3. The inner vessel 20 and the outer vessel 25 each include an upper portion 30 and a lower portion 35. The upper portion 30 and the lower portion 35 are connected by side walls 40 in the case of the inner vessel 20, and side walls 45 in the case of the outer vessel 25. For reasons discussed in greater detail hereinbelow, the side walls 45 of the outer vessel 25 also preferably include one or more holes 47, which may occupy approximately half of its side walls 45. Other structures for venting the inside of outer vessel 25 to atmosphere are also envisioned. Each of the side walls 40, 45 are shown as tapering inwardly in the direction from the upper portion 30 to the lower portion 35. This tapered shape makes each of the inner vessel 20 and outer vessel 25 easier to grip for an operator. In alternative embodiments, either or both of the vessels 20, 25 may be alternatively shaped, such as being cylindrical.

The upper portion 30 of each of the vessels 20, 25 is open. Upper portion 30 of the inner vessel 20 is open to allow food or liquid to be poured in. Upper portion 30 of the outer vessel 25 is open to receive the inner vessel 20 therethrough. The upper portion 30 of each of the vessels 20, 25 may also include rim portions 50, 55, respectively. The rim portions 50, 55 may preferably have circumferences slightly greater than their respective walls 40, 45. In any event, the rim portion 55 of the outer vessel 25 is preferably only modestly larger than the rim portion 50 of the inner vessel 20. An exterior 60 of the rim portion 50 preferably includes threads 61 (see FIG. 4A), and an interior 65 of the rim portion 55 also preferably includes threads 66 (see FIG. 4A). In an example embodiment, the threads 61 on the rim portion 50 are right-handed, and the threads 66 on the rim portion 55 are left-handed. In that scenario, when the rim portion 50 is turned to the clockwise and/or the rim portion 55 is turned counter-clockwise, the rim portions 50, 55 engage one another, thus engaging the vessels 20, 25 with one another.

The lower portion 35 of the outer vessel 25 is preferably substantially closed. The same is true of the lower portion 35 of the inner vessel 20, with the exception that the inner vessel 20 may include a vent hole 70 that extends completely through its lower portion 35. A hollow plug 75 may be selectively plugged into the vent hole 70. In an example embodiment, the plug 75 is preferably made of a pliable or elastically deformable material (e.g., silicon). The plug 75 may include a stopper member 80 and a tapered body portion 85. When the plug 75 is plugged into the vent hole 70, the tapered body portion 85 is preferably pushed upwardly until the stopper member 80 abuts the bottom solid portion of the inner vessel 20. The plug 75 preferably also includes a hollow channel 90 that spans its entire length to allow communication between the vessels 20, 25 in certain conditions, described below.

The outer vessel 25 includes a projection member 95 projecting upwardly from its lower portion 35. The projection member 95 is positioned and located such that it abuts the plug 75 when the vessels 20, 25 are engaged (when not engaged with the blade assembly 10 and/or motor base 15). Specifically, the projection member 95 abuts the stopper member 80 such that the hollow channel 90 is substantially blocked, and contents filled within the inner vessel assembly 20 do not leak therethrough. In this configuration with the hollow channel 90 sealed, contents to be blended or processed may be added to the inner vessel 20.

Figure 4:
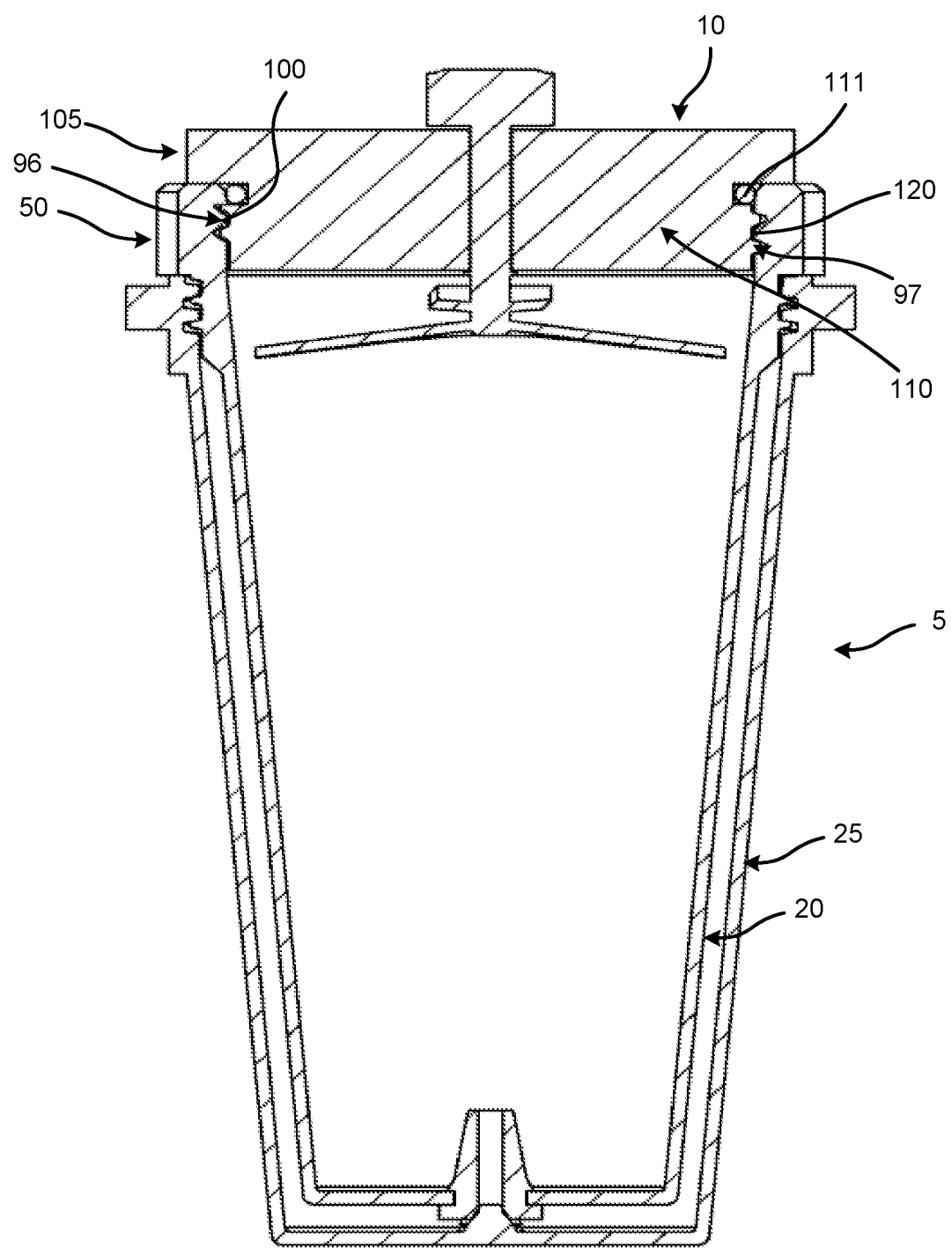
FIG. 4 is a cross-sectional view of the vessel assembly of FIG. 3 with a blade assembly releasably engaged therewith.
Figure 4A:
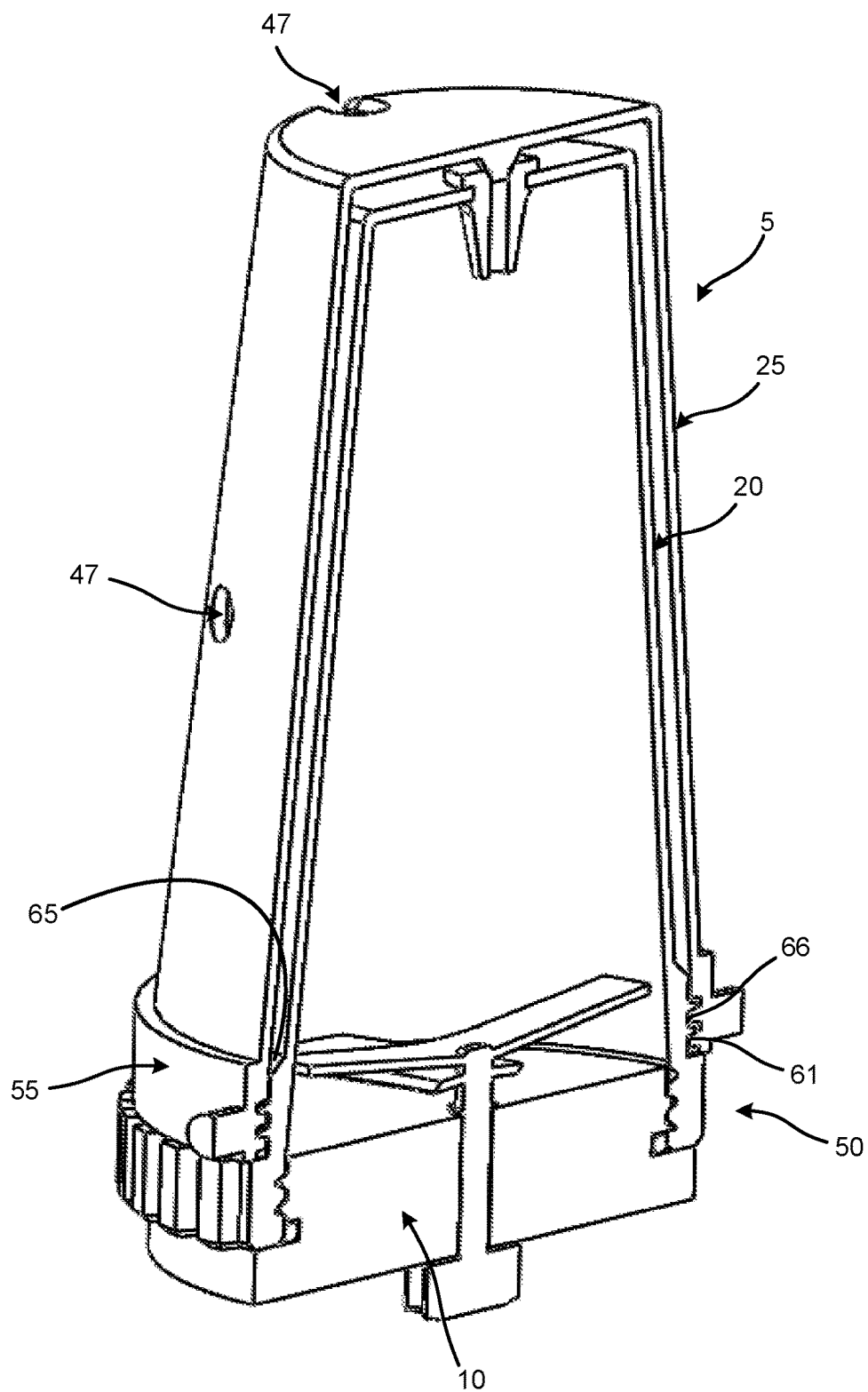
FIG. 4A is a pa cross-sectionalerspective view of the vessel assembly with a blade assembly releasably engaged therewith of FIG. 4 in an inverted position.

Turning to FIGS. 4 and 4A, the rim portion 50 of the inner vessel 20 also preferably includes threads 96 (FIG. 4A) at an interior portion 100 of the rim portion 50. The threads on the interior portion 100 are selectively engageable with threads 97 (FIG. 4A) on the blade assembly 10. The blade assembly 10 preferably includes each of an upper housing 105 and a lower housing 110. The upper housing 105 is preferably distinguished from the lower housing 110 by having a greater diameter than the lower housing 110. The upper housing 105 and the lower housing 110 may be separated by an annular recess that circumscribes the blade assembly 10 near its middle. The annular recess may be provided with an O-ring 111 for sealing the inner vessel 20 with the blade assembly 10. In alternative embodiments, the upper housing 105 and the lower housing 110 may be separated by a ring-shaped lip member (not shown) that circumscribes the blade assembly 10 near its middle. The lower housing 110 preferably includes threads 97 on an exterior portion 120. The threads 97 on the exterior portion 120 are preferably right-handed, and the threads 96 on the interior portion 100 are preferably left-handed. Thus, when the exterior portion 120 is turned clockwise and/or the interior portion 100 is turned counter-clockwise, the portions 100, 120 engage one another. This engages the blade assembly 10 to the vessel assembly 5. When the blade assembly 10 and the vessel assembly 5 are selectively engaged with one another, the upper housing 105 preferably abuts the rim portion 50 of the inner vessel 20 to further secure the blade assembly 10. In embodiments in which a lip member separates the upper housing 105 and the lower housing 110, the lip member preferably abuts the rim portion 50 of the inner vessel 20 when the blade assembly 10 and the vessel assembly 5 are selectively engaged with one another. In alternative embodiments, the blade assembly 10 and the inner vessel 20 may be engageable with one another using alternative, known releasable connection means, e.g., a friction fit, snap fit or a bayonet fit.

Figure 5:
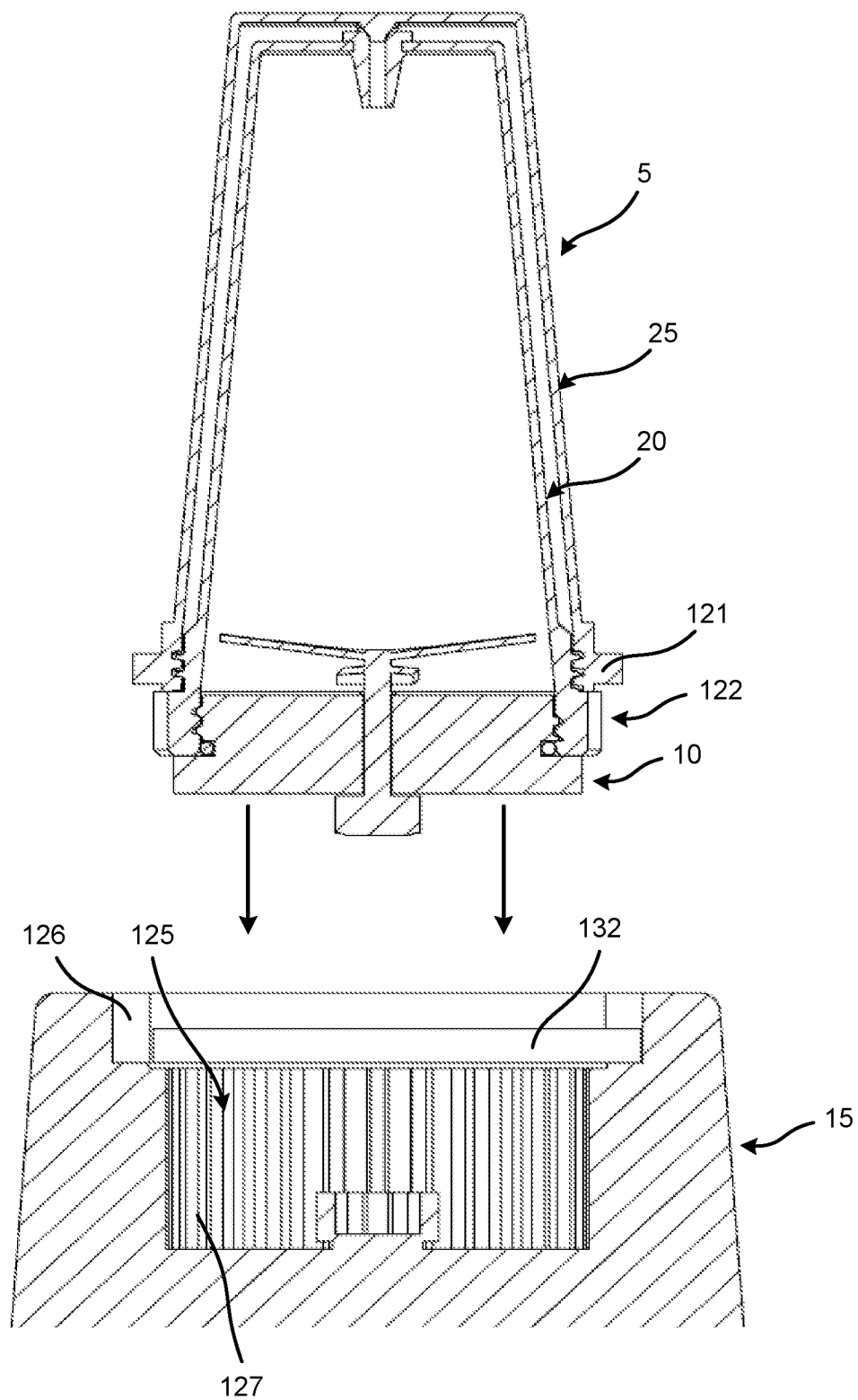
FIG. 5 is a cross-sectional view of the vessel assembly and blade assembly being releasably engaged with a mounting base.
Figure 6:
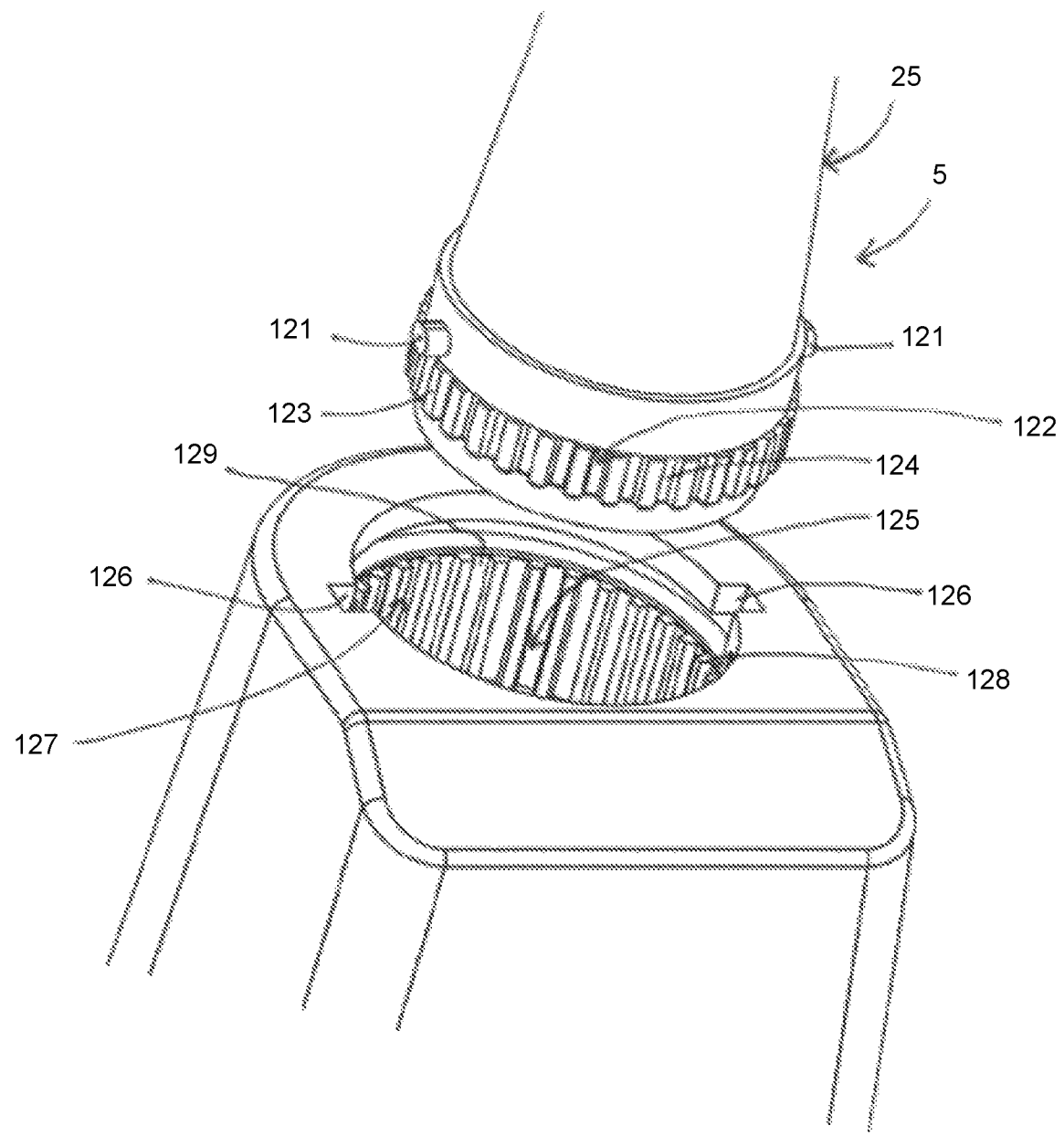
FIG. 6 is a perspective view of the vessel assembly and blade assembly being releasably engaged with a mounting base.
Figure 7:
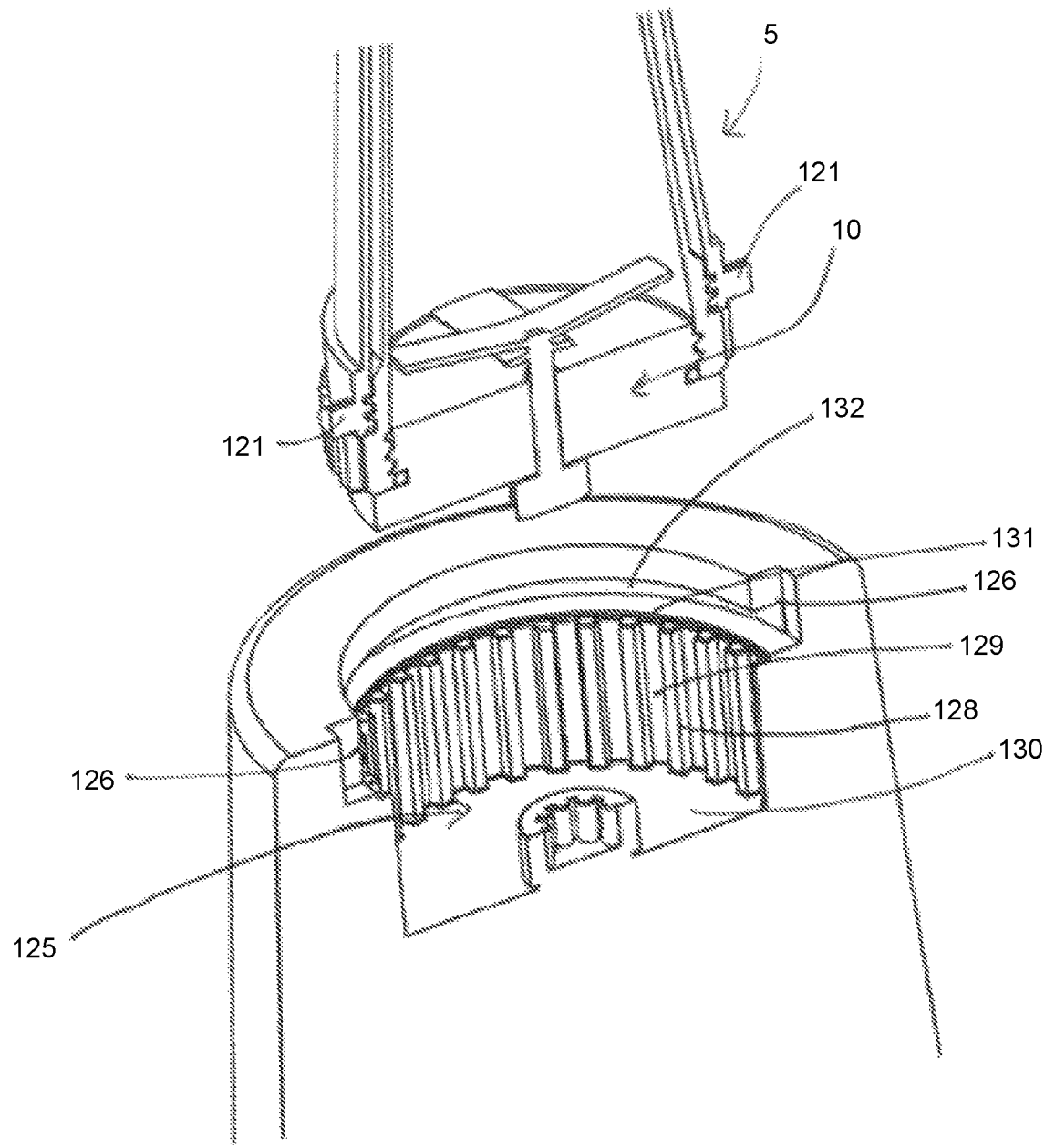
FIG. 7 is a cross-sectional perspective view of the vessel assembly and blade assembly being releasably engaged with a mounting base.
Figure 8:
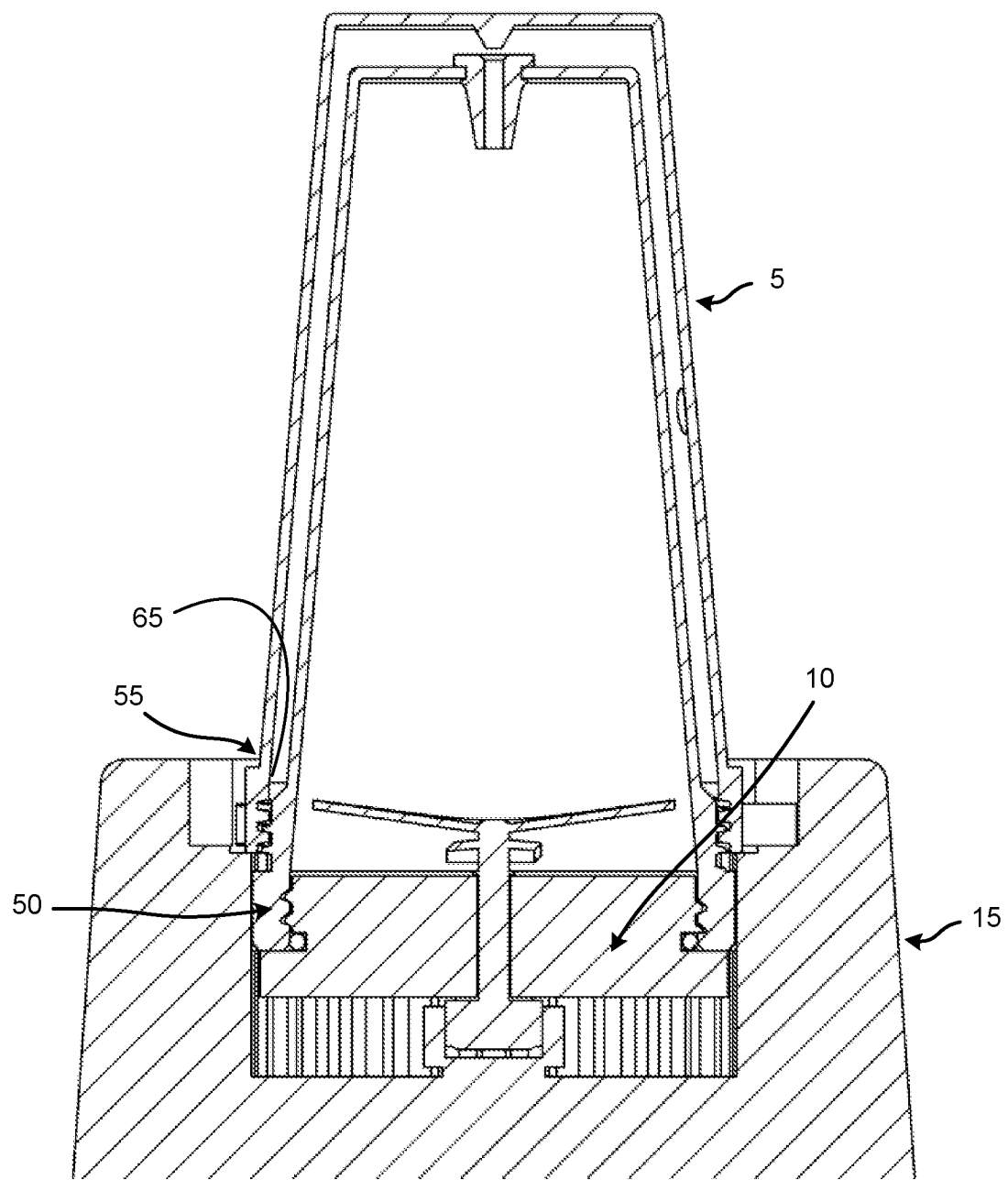
FIG. 8 is a cross-sectional view of the vessel assembly and blade assembly releasably engaged with the mounting base.

With the blade assembly 10 releasably engaged with the vessel assembly 5, the assemblies 5, 10 may be inverted so that the blade assembly 10 may be engaged with the base 15 (as shown in FIG. 5). Turning now to FIGS. 6-8, the vessel assembly 5 including the blade assembly 10 and the base 15 are preferably selectively engageable with one another using yet another selective attachment mechanism.

More particularly, an exterior portion 120 of the rim portion 55 of the outer vessel 25 preferably includes bayonet tabs 121 that extend outwardly from the rim portion 55. An exterior portion 60 of the rim portion 50 of the inner vessel 20 also preferably includes a spline 122 that surrounds at least a portion of the circumference of the rim portion 50. The spline 122 preferably includes a plurality of alternating vertically-oriented, spaced-apart slats 123 and slits 124.

An interior receiver portion 125 of the base 15 for receiving the assemblies 5, 10 also preferably includes bayonet slots 126 keyed to receive the bayonet tabs 121 of the outer vessel 25. In the illustrated embodiment, the outer vessel 25 and the interior receiver portion 125 include two bayonet tabs 121 and two bayonet slots 126, respectively. Those tabs 121 and slots 126 are preferably located in substantially the same circumferential location on the outer vessel 25 and the interior receiver portion 125, respectively. Thus, when aligned with one another, the slots 126 receive the tabs 121. More or fewer tabs 121 and slots 126 may be provided in alternative embodiments than the two tabs 121 and slots 126 illustrated.

The interior receiver portion 125 also preferably includes a spline 127 that surrounds at least a portion of its circumference. Like the spline 122, the spline 127 preferably includes a plurality of alternating vertically-oriented, spaced-apart slats 128 and slits 129 that extend upwardly from a bottom floor surface 130 of the receiver portion 125 to a top portion 131 of the receiver portion 125 positioned below the slots 126 (see FIG. 7). The slats 123, 128 are complementary to one another such that when the base 15 receives the assemblies 5, 10, the slats 123, 128 abut one another because slits 129 receive and engage slats 123, and slits 124 receive and engage slats 128. With the slats 123, 128 abutting one another, rotational movement between the inner vessel 20 and interior receiver portion 125 is prevented.

FIG. 7 further illustrates a channel 132 of the interior receiver portion 125 that preferably partially circumscribes the interior receiver portion 125. The channel 132 is preferably located substantially between the tabs 121. A channel substantially similar to the channel 132 (not illustrated) is preferably located opposite the channel 132, also located between the tabs 121. Each of the channels (channel 132 and the channel not illustrated opposite the channel 132, collectively referred to as the channels 132) preferably allow for the tabs 121 to be rotated therein upon the tabs 121 entering the slots 126. The channels 132 preferably each have approximately 160° of rotation. The tabs 121 may thereby rotate within the channels 132 from one slot 126 nearly to the other slot 126, without completing a full half-rotation.

More specifically, after the tabs 121 are aligned and inserted into the slots 126, the outer vessel 25 and inner vessel 20 may then be separable from one another. After the tabs 121 are inserted into the slots 126, as set forth above, so too are the splines 122, 127 preferably engaged with one another. With the splines 122, 127 engaged with one another, the inner vessel 20 and the base 15 are also preferably engaged with one another in a manner that restricts rotational movement of one relative to the other. As such, when the outer vessel 25 is turned counter-clockwise, the tabs 121 slide similarly counter-clockwise within the channels 132. Because the inner vessel 20 and the base 15 preferably cannot move rotationally relative to one another, when the outer vessel 25 rotates, it moves relative to the inner vessel 20 as the tabs 121 are moved counter-clockwise in the channels 132.

As set forth above, the inner vessel 20 is preferably engaged to the outer vessel 25 by clockwise screwing the inner vessel 20 into the outer vessel 25. Thus, the counter-clockwise motion of the outer vessel 25 relative to the base 15 (when the tabs 121 move within the channels 132) preferably causes the outer vessel 25 to separate upwardly and away from the inner vessel 20 and blade assembly 10. Preferably, the channels 132 together have 7 mm of pitch. This corresponds to the pitch of the thread 61 on the exterior 60 of the rim portion 50 and thread 66 on the interior 65 of the rim portion 55 and allows the inner vessel 20 and the outer vessel 25 to separate 3 mm or more such that they are sufficiently separate from one another to allow the valve projection 95 to unseat and be displaced away from the opening 90 in the hollow plug 75 and allow heat induced pressure to be released by allowing steam to vent away from the vessel assembly 5 via openings 47.

In alternative embodiments, the channels 132 may have no pitch. In such embodiments, the counterclockwise motion of the outer vessel 25 relative to the base 15 (when the tabs 121 move within the channels 132) may cause the inner vessel 20 and blade assembly 10 to separate downwardly and away from the outer vessel 25, as shown in FIG. 8. Alternatively, the channels 132 may be dimensioned so as to provide the tabs 121 with clearance sufficient to allow the inner vessel 20 and the outer vessel 25 to be unscrewed from one another by the amount necessary to allow the valve projection 95 to unseat and be displaced away from the opening 90 in the hollow plug 75 and allow heat induced pressure to be released by allowing steam to vent away from the vessel assembly 5 via openings 47.

As a further feature of embodiments in which a lip member separates the upper housing 105 and the lower housing 110, after the vessel assembly 5 and blade assembly 10 is engaged with the base 15 in the manner described above, the lip member may abut a ledge (not shown) seated within the interior receiver portion 125. The ledge may include a circumference smaller than that of the lip member so that the lip member does not screw downwardly past the ledge.

Figure 9:
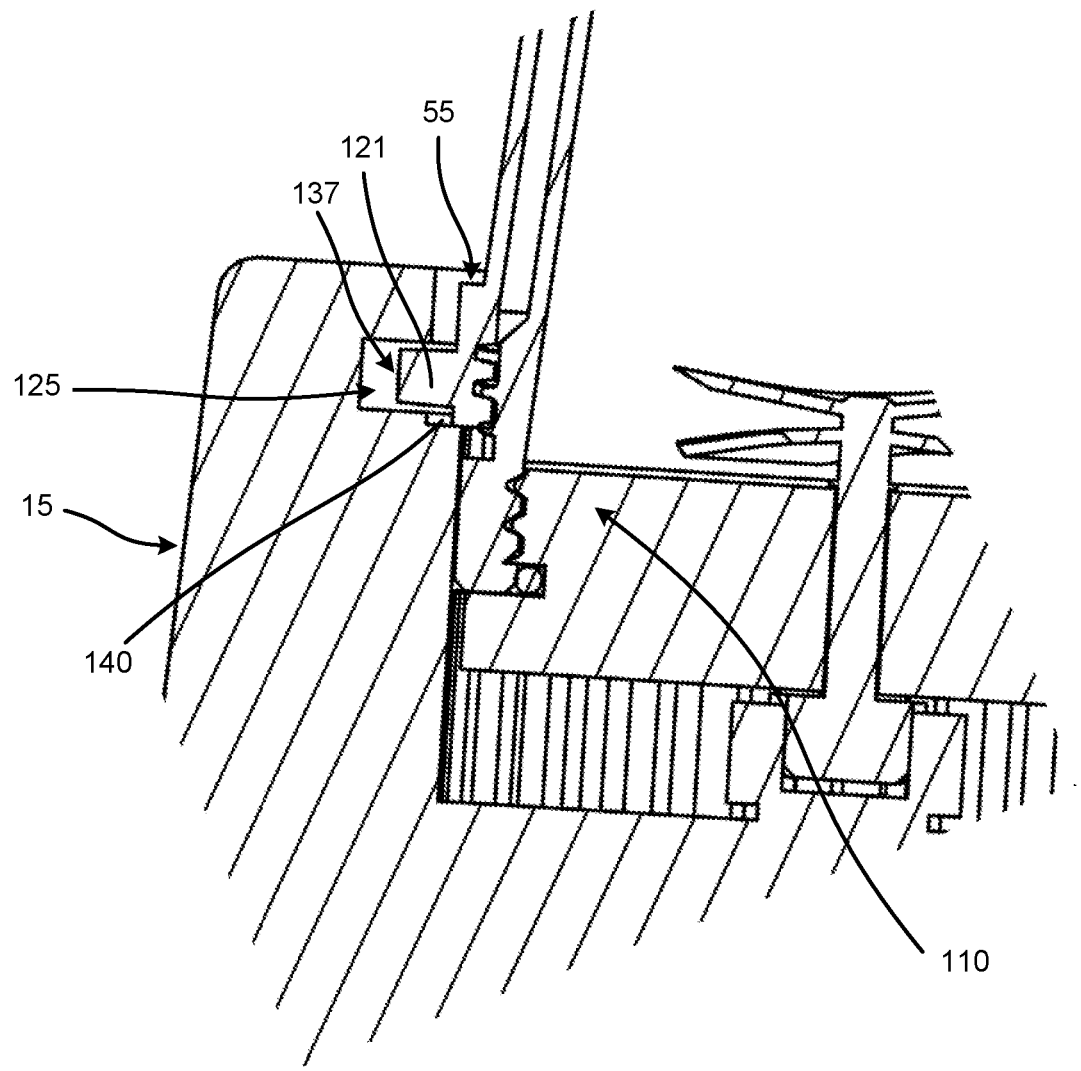
FIG. 9 is an enlarged view of an interlock mechanism between the outer vessel and a safety mechanism of the base illustrated in FIG. 8.

FIG. 9 provides an enlarged view of the connection between the vessel assembly 5 and blade assembly 10, and the base 15. As shown in FIG. 9, the exterior portion 120 of the rim portion 55 of the outer vessel 25 is also preferably provided with a lug member 137 that projects radially away from the rim portion 55. The lug member 137 may take on a number of shapes and sizes. In some embodiments, such as the embodiment depicted in FIG. 9, the lug member 137 may be formed by the bayonet tab 121. An interlock 140 is also preferably provided within the interior receiver portion 125 of the base 15. The interlock 140, which may take on a number of shapes and sizes as well, is preferably positioned and located such that when the vessel assembly 5 is screwed into the base 15, the interlock 140 is also depressed. For example, the interlock 140 may be positioned and located at an end of one of the channels 132 distal of the respective slot 126 such that it is depressed by the respective bayonet tab 121 that forms the lug member 137. With the interlock 140 depressed, an operator is permitted to activate the motor in the base 15 in a manner commonly known and understood in the art. The operator preferably is only able to do so when the interlock 140 is depressed because that means that the food processor 1 is in its venting position, shown in FIG. 10 and described below.

Figure 10:
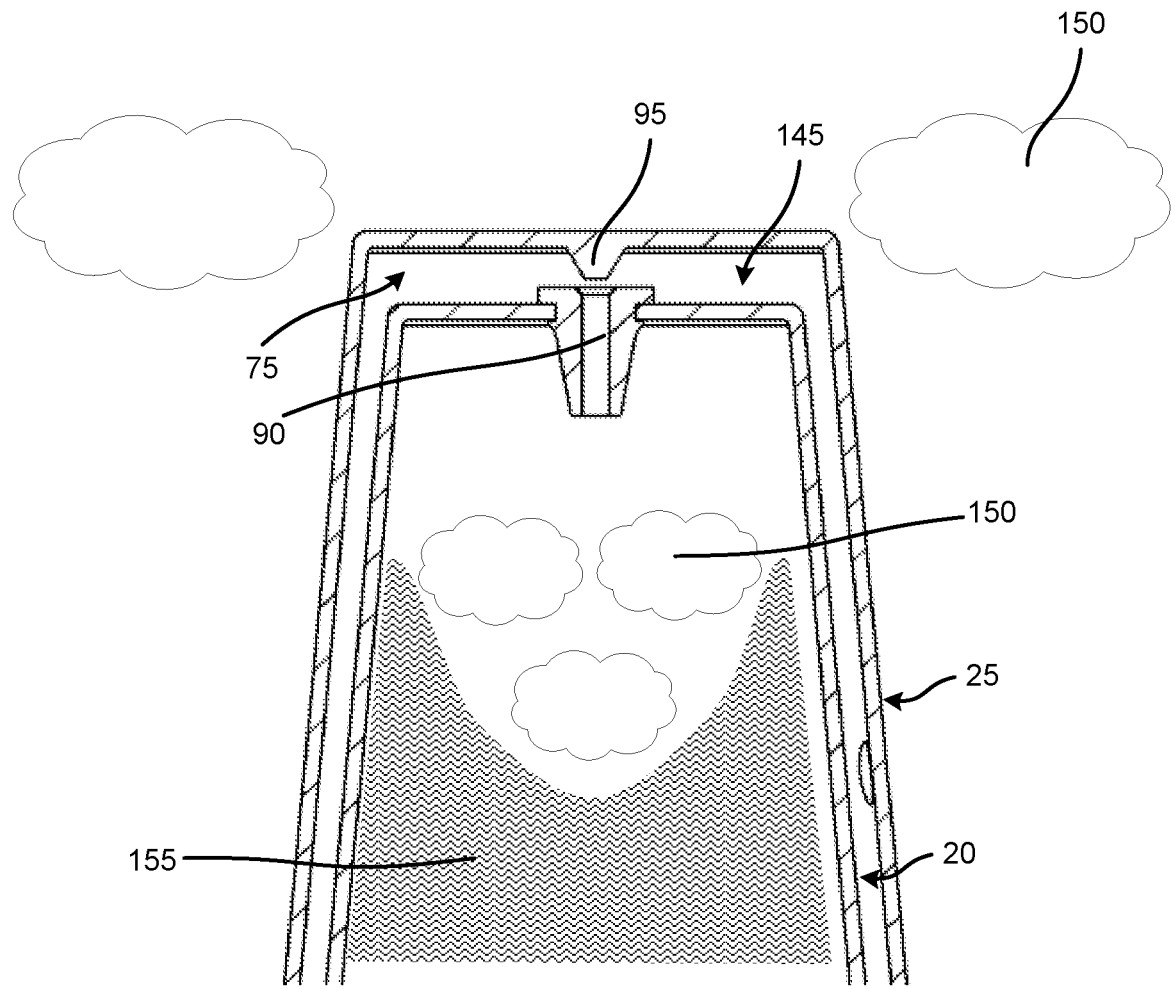
FIG. 10 illustrates heat being released from the vessel assembly when the food processor is in use.

The separation described above between the outer vessel 25 and the inner vessel 20 preferably forms a gap 145 between the outer vessel 25 and the inner vessel 20, as shown in FIG. 10. As the gap 145 is formed, the plug 75 and the projection member 95 also preferably separate from one another. With the plug 75 and the projection member 95 separating from one another, the hollow channel 90 is preferably no longer sealed by the projection member 95. Heat 150 shown in FIG. 10 may be vented from the inner vessel 20 to the outer vessel 25 via the hollow channel 90. That heat 150 may subsequently be vented to atmosphere by way of the holes 47 in the outer vessel 25 (shown in FIG. 2) or other suitable venting structure.

Figure 11:
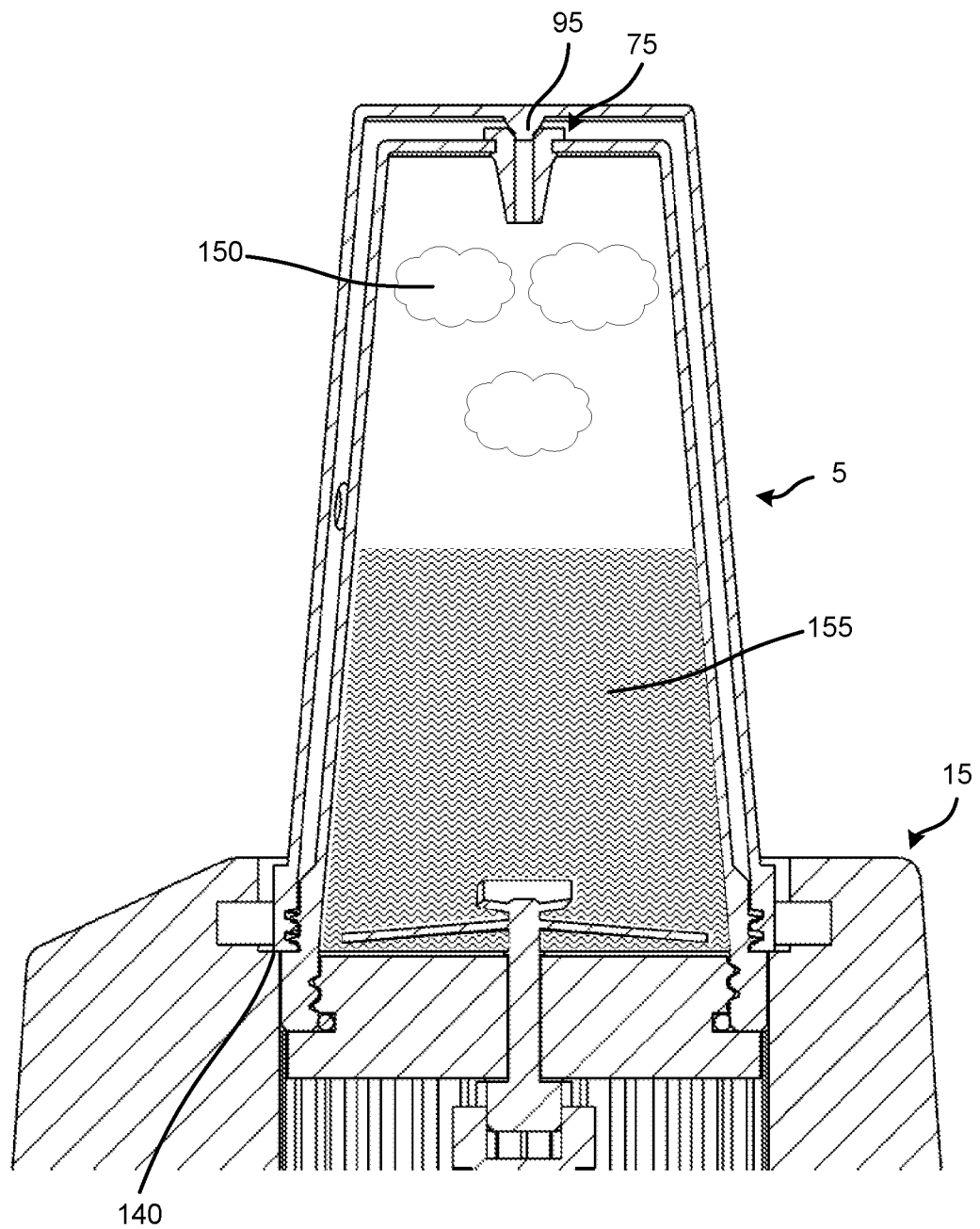
FIG. 11 illustrates the outer vessel rotated such that the vessel assembly and blade assembly may be removed from the base.
Figure 12:
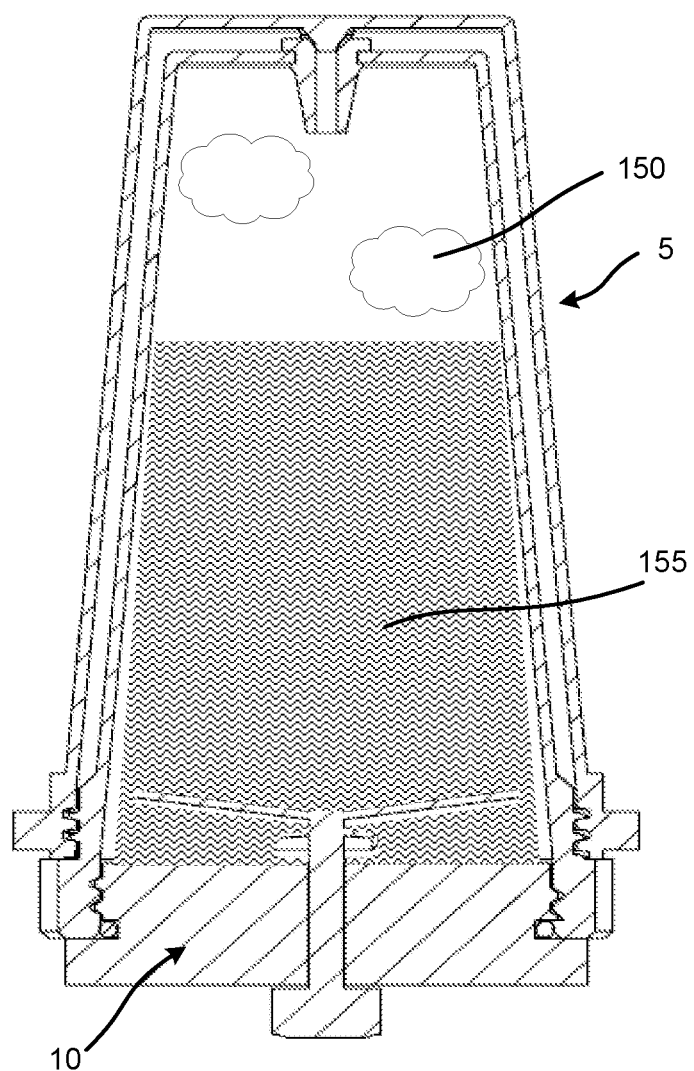
FIG. 12 illustrates the vessel assembly and blade assembly being removed from the base.
Figure 12:
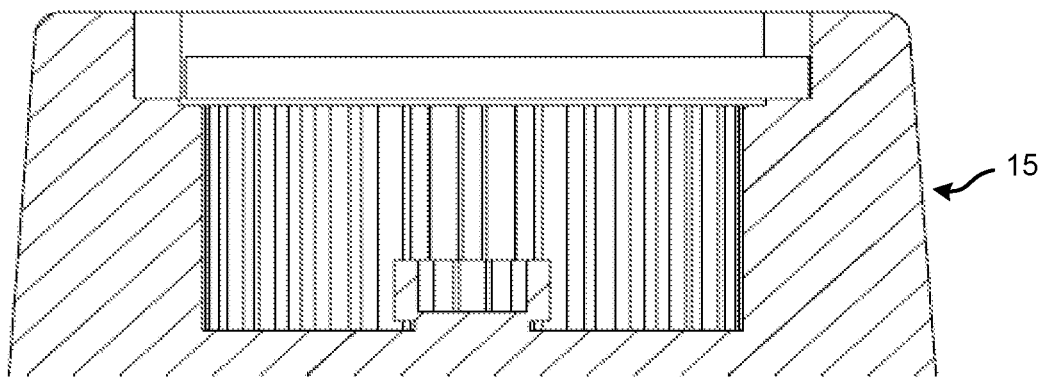

When the blending process is done, a blended product such as blended product 155 shown in FIG. 11 is preferably produced. The reverse process described above may be undertaken to 1) disengage the lug member 137 from the interlock 140; 2) re-seal the plug 75 and the projection member 95 to one another; and 3) disengage the vessel assembly 5 and the blade assembly 10 from the base 15 (see FIG. 12).

Figure 13:
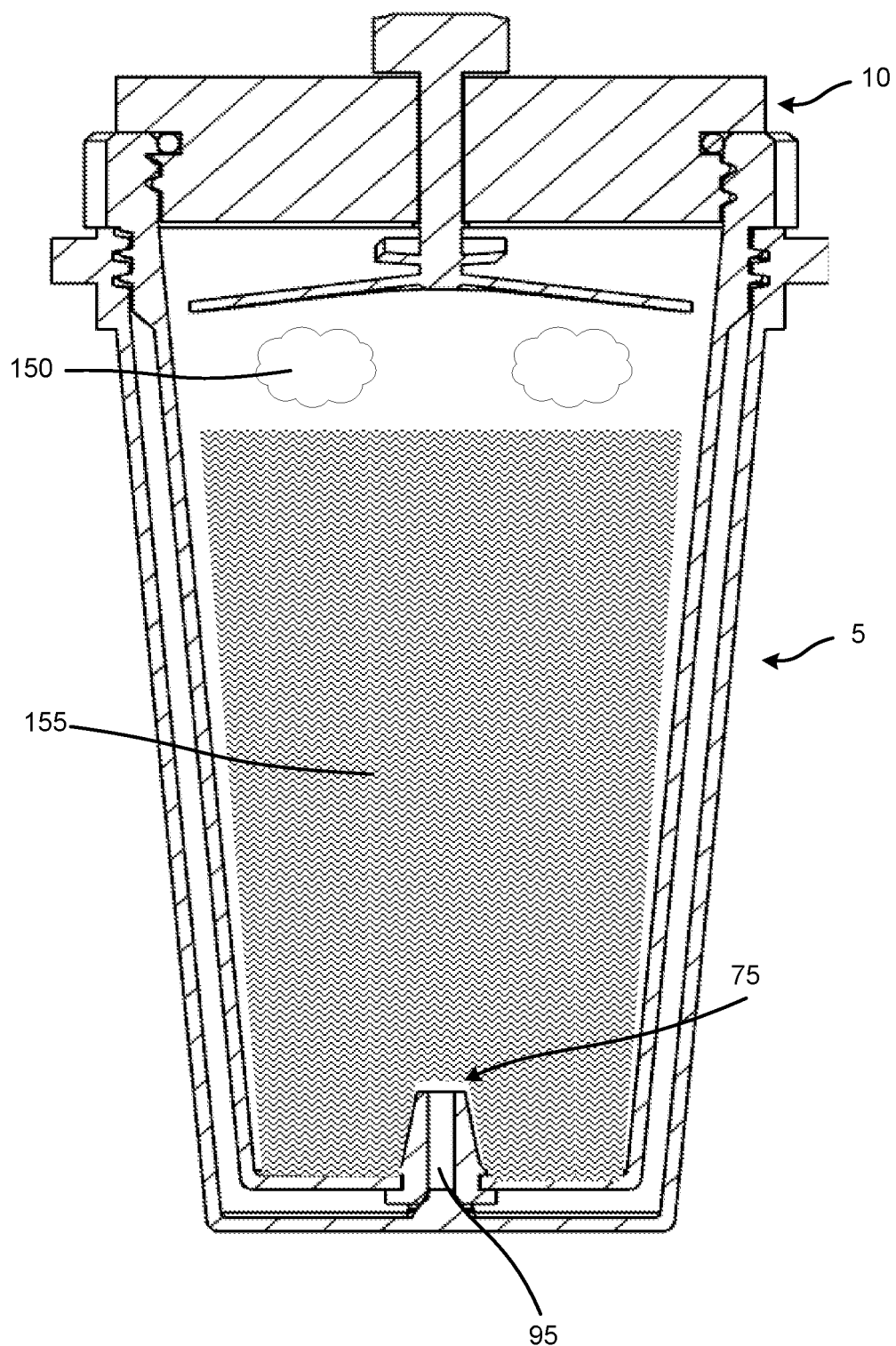
FIG. 13 illustrates the vessel assembly and blade assembly in its upright position.
Figure 14:
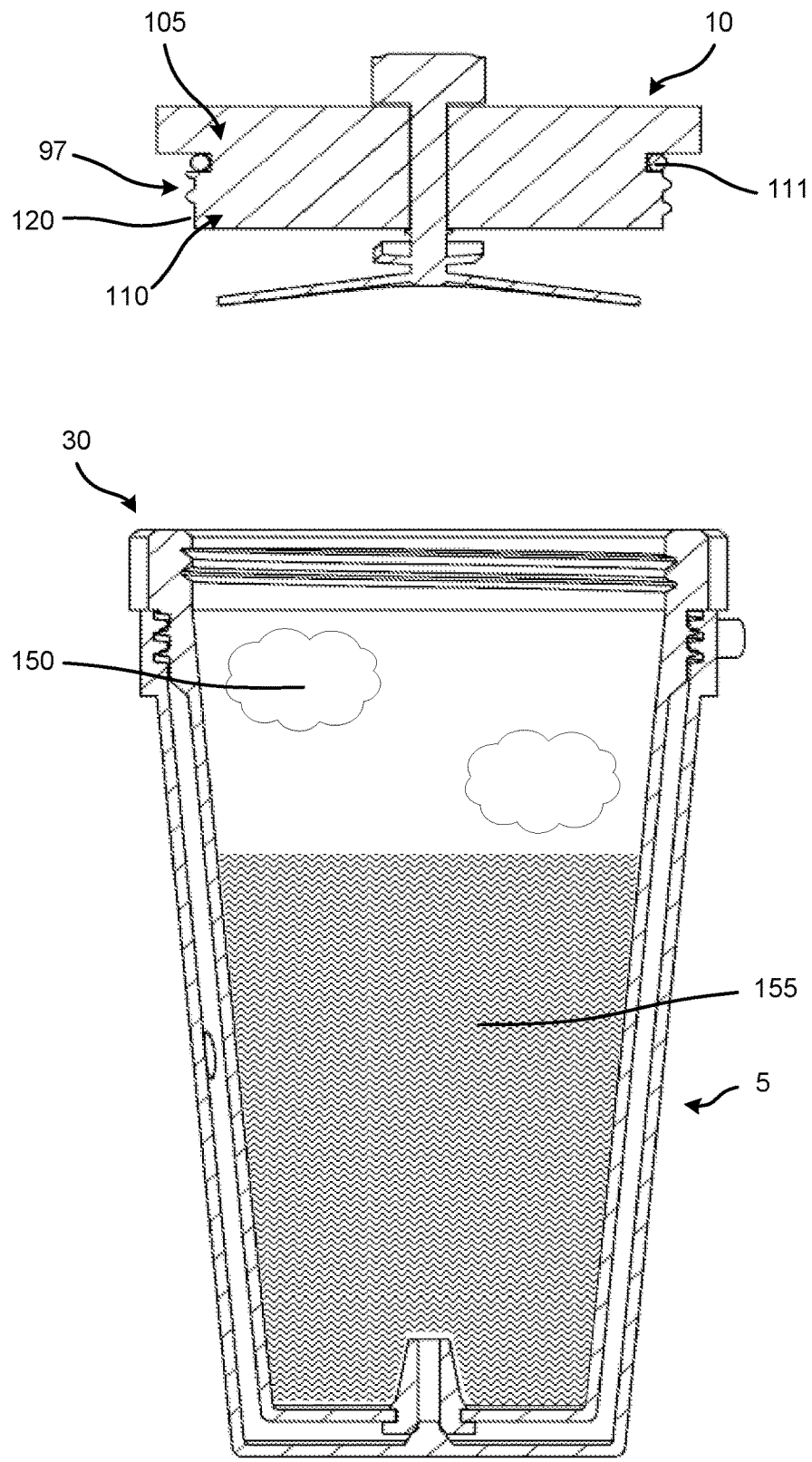
FIG. 14 illustrates the blade assembly being removed from the vessel assembly.
Figure 15:
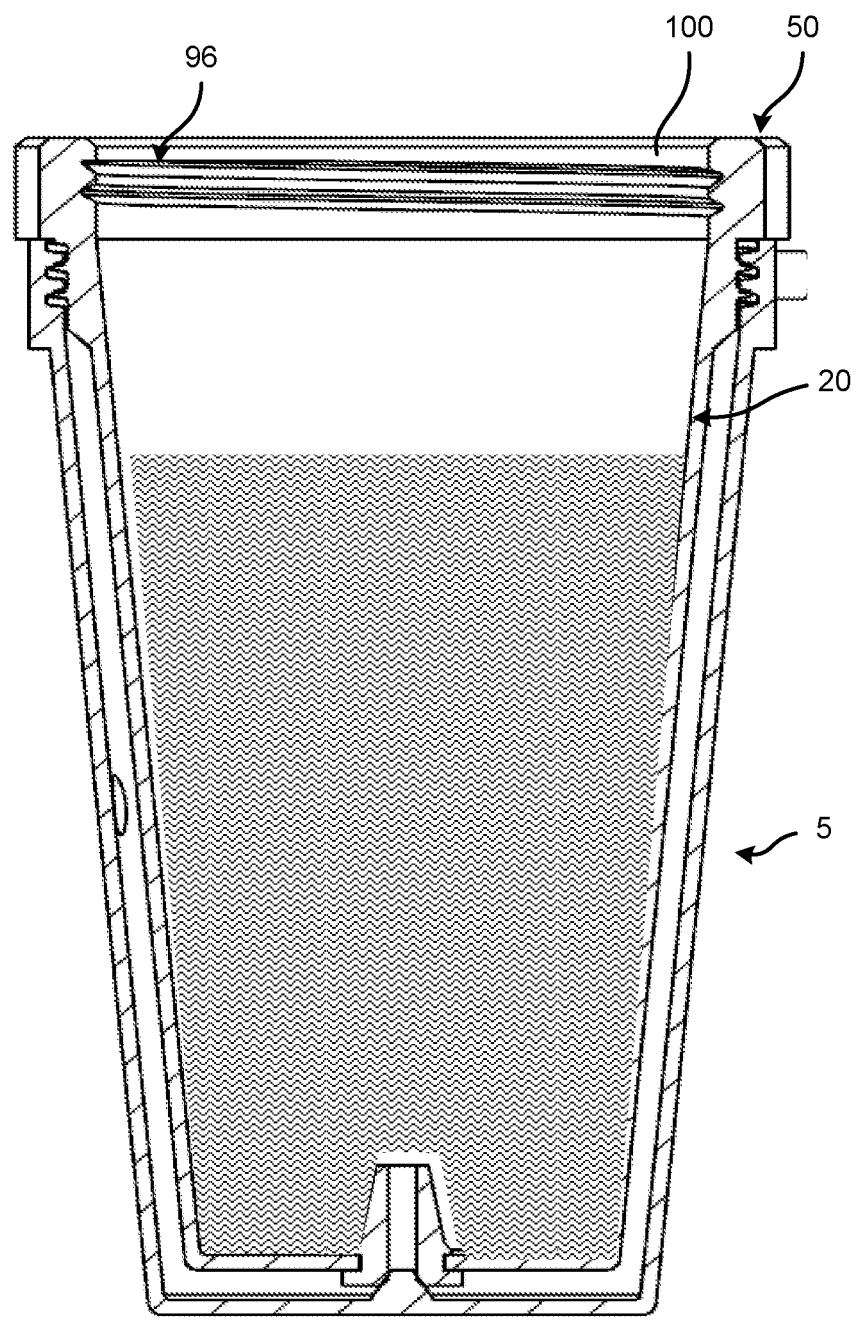
FIG. 15 illustrates the blade assembly replaced with a lid member.

Then, as shown in FIG. 13, the vessel assembly 5 and the blade assembly 10 may be inverted. Because there is preferably a seal at this point between the plug 75 and the projection member 95, none of the blended product 155 leaks from the vessel assembly 5. At this point, again the reverse of the process described above may be used to unscrew or otherwise remove the blade assembly 10 from the vessel assembly 5, as shown in FIG. 14. Some of the heat 150 that was not previously vented may now be able to vent from the upper portion 30 of the vessel assembly 5.

However, before too much of the heat 150 escapes, a lid member (not shown) is preferably screwed or otherwise attached to the vessel assembly 5. The lid member is preferably selectively engaged with the vessel assembly 5 by way of threads located on the inner vessel 20 at an interior portion 100 of the rim portion 50, as described above. The vessel assembly 5 and the lid member may now be transported and the contents enjoyed "on the go."

Figure 16:
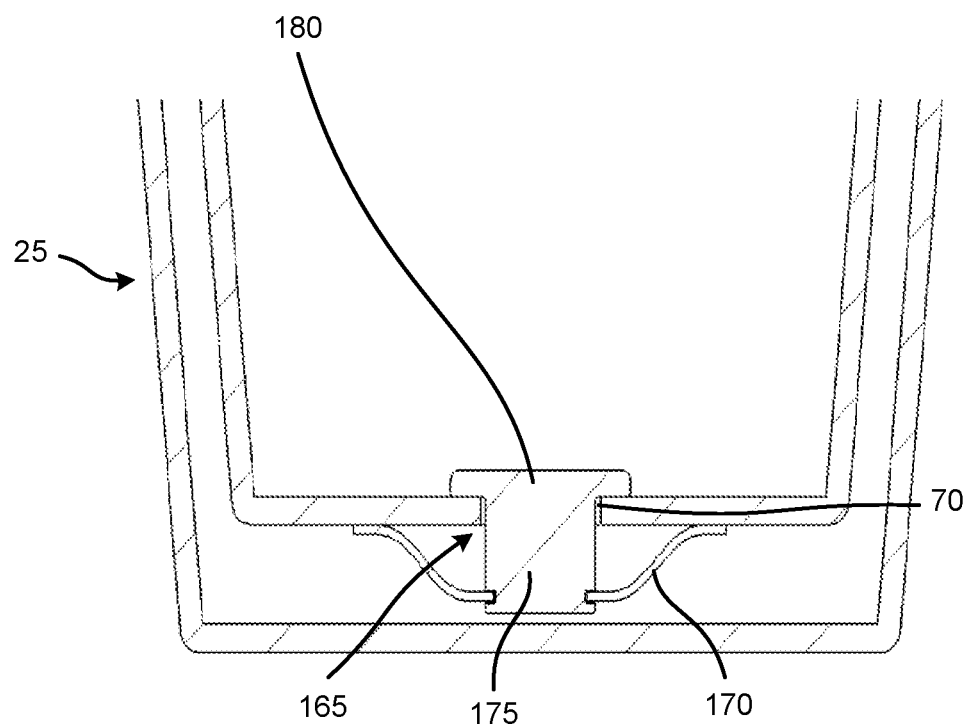
FIG. 16 illustrates an alternative embodiment for biasing the valve in its closed position.

An alternative valving mechanism to the plug 75 and the projection member 95 described above is illustrated in FIGS. 16 and 17. In that embodiment, an alternative plug member 165 is provided that does not include a hollow channel. Similarly, the outer vessel 25 shown in the alternative embodiment of FIGS. 16 and 17 does not include a projection. Instead, the plug member 165 includes one or more biasing arms 170 that extend laterally from a base portion 175 of the plug member 165. The plug member 165 also preferably includes a stopper portion 180 that seals the vent hole 70 in the inner vessel 20. In its closed position, the biasing arms 170 may provide a biasing force such that the stopper portion 180 covers the vent hole 70, and fluid or food product may not leak from the inner vessel 20 toward the outer vessel 25.

However, when the outer vessel 25 moves towards the inner vessel 20, the lower portion 35 of the outer vessel 25 preferably pushes upwardly against the base portion 175 of the plug member 165. The force of the outer vessel 25 being pushed toward the inner vessel 20 may overcome the biasing force of the biasing arms 170, causing the stopper portion 180 to move away from the vent hole 70. This creates a flow path 185 for heated air to vent through during blending.

Figure 17:
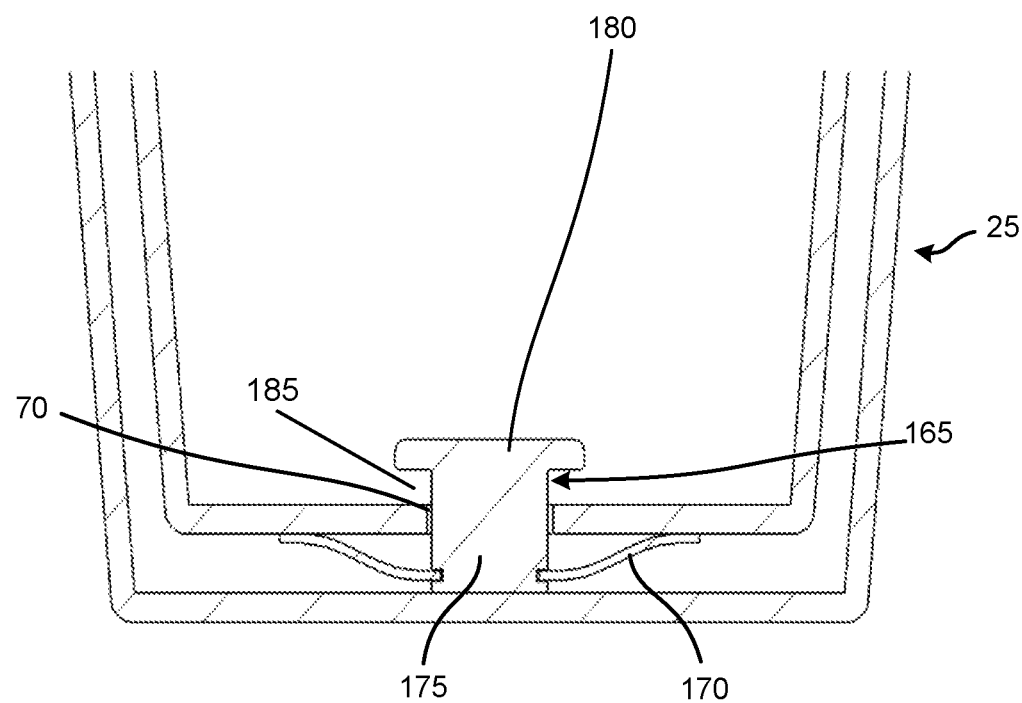
FIG. 17 illustrates an alternative embodiment for biasing the valve in its open position.

In FIG. 17, where the vent hole 70 is shown as open, the vessel assembly 5 would actually be inverted, such as shown in FIG. 1. Thus, a different mechanism may be used in order to cause the lower portion 35 of the outer vessel 25 to now push downwardly against the base portion 175 of the plug member 165 and thus eventually open the vent hole 70. More specifically, the outer vessel 25 preferably get closer to the inner vessel 20 (or the inner vessel 20 is pushed upwardly toward the outer vessel 25) to push downwardly on the plug member 165. Therefore, to make this operation work, the thread between the inner vessel 20 and the outer vessel 20 and, the engagement means of the vessel assembly 5 and the blade assembly 10 set to the motor base 15 are preferably both right-handed threads. With all of the aforementioned engagement mechanisms set to be right-handed (or all left-handed in an alternative embodiment), the outer vessel 25 may be moved closer to the inner vessel 20 when it is screwed into the base 15. Thus, the valving mechanism shown in FIG. 17 is used during the blending process, and is returned to the mechanism shown in FIG. 16 when blending is completed, prior to re-inverting the vessel assembly to its upright position.

Whilst the embodiments described above utilise complemental threads to engage the inner vessel with the outer vessel, it is envisioned that other embodiments may utilise alternative means. For example, the inner vessel may be engaged with the outer vessel with a frictional fit or a bayonet fitting, or the two vessels may be "clicked" together in a snap fit.

In addition, whilst the embodiments described above open and close the vent hole 70 through relative translational movement of the inner and outer vessels away from or towards each other, it is envisioned that other embodiments may utilise alternative means. For example, a rotationally operated valve may be positioned and located in the ventilation pathway between the vent hole in the inner vessel and the venting structure in the outer vessel. Such a rotationally operated valve may be opened and closed through relative rotational movement between the inner and outer vessels.

As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A food processor, the food processor comprising:
   an open ended vessel assembly comprising:
   an outer vessel having an open end and a closed end, and including at least one vent opening; and
   an inner vessel having an open end and a closed end and being configured to nest within the outer vessel in releasable engagement therewith;
   a vent hole defined in the inner vessel in the region of the closed end thereof;
   a valve arrangement operable to open and close the vent hole;
   a blade assembly selectively engageable with the open end of the vessel assembly to close off the inner vessel; and
   a base selectively engageable with at least one of the vessel assembly and the blade assembly, wherein upon engagement thereof, the valve arrangement is opened such that the vent hole is exposed to atmosphere via the at least one vent opening of the outer vessel and heated air generated during operation of the base and blade assembly may be vented to atmosphere;
   wherein upon disengagement of the vessel assembly from the base or blade assembly, the valve arrangement is closed to seal the vent hole such that blended product does not leak from the upright inner vessel; and
   wherein the valve arrangement is actuable into an open or closed position in response to the closed ends of the inner and outer vessels moving away from or towards one another.

2. A food processor according to claim 1 wherein the valve arrangement is actuable into the open position in response to the closed ends of the inner and outer vessels moving away from one another, and into the closed position in response to the closed ends of the inner and outer vessels moving towards one another.

3. A food processor according to claim 2 wherein the valve arrangement comprises a hollow plug fixed within the vent hole in the closed end of the inner vessel, and an inner face of the outer vessel comprises a formation for selectively opening and closing the plug as the closed ends of the vessels are moved respectively away from or towards one another.

4. A food processor according to claim 3 wherein the formation comprises a projection extending from an inner face of the outer vessel for selectively opening and closing the plug as the closed ends of the vessels are moved respectively away from or towards one another.

5. A food processor according to claim 1 wherein the valve arrangement is actuable into the open position in response to the closed ends of the inner and outer vessels moving towards one another, and into the closed position in response to the closed ends of the inner and outer vessels moving away from one another.

6. A food processor according to claim 5 wherein the valve arrangement comprises a moveable plug member comprising a base portion and a stopper portion, the base portion extending through the vent hole in the closed end of the inner vessel, and the stopper portion configured for selectively opening and closing the plug as the closed ends of the vessels are moved respectively towards or away from one another.

7. A food processor according to claim 6 wherein the valve arrangement further comprises a biasing arrangement for providing a biasing to bias the moveable plug member into a closed position.

8. A food processor according to claim 7 wherein the biasing arrangement comprises biasing arms extending laterally from the base portion to provide the biasing force to bias the moveable plug member into the closed position such that the stopper portion covers the vent hole.

9. A food processor according to claim 1 wherein the inner and outer vessels are threadingly engagable with one another.

10. A food processor, the food processor comprising:
    an open ended vessel assembly comprising:
    an outer vessel having an open end and a closed end, and including at least one vent opening; and
    an inner vessel having an open end and a closed end and being configured to nest within the outer vessel in releasable engagement therewith;
    a vent hole defined in the inner vessel in the region of the closed end thereof;
    a valve arrangement operable to open and close the vent hole;
    a blade assembly selectively engageable with the open end of the vessel assembly to close off the inner vessel; and
    a base selectively engageable with at least one of the vessel assembly and the blade assembly, wherein upon engagement thereof, the valve arrangement is opened such that the vent hole is exposed to atmosphere via the at least one vent opening of the outer vessel and heated air generated during operation of the base and blade assembly may be vented to atmosphere;
    wherein upon disengagement of the vessel assembly from the base or blade assembly, the valve arrangement is closed to seal the vent hole such that blended product does not leak from the upright inner vessel; and
    wherein the valve arrangement is actuable into an open or closed position in response to the inner and outer vessels rotating relative to one another.

11. A food processor according to claim 10 wherein the inner and outer vessels are engagable with one another in a snap fit or with a bayonet fitting.

12. A food processor according to claim 1 wherein the blade assembly is threadingly and sealingly engageable with the open end of the vessel assembly to close off the inner vessel.

13. A food processor according to claim 12 wherein the blade assembly is threadingly and sealingly engageable with the inner vessel.

14. A food processor, the food processor comprising:
an open ended vessel assembly comprising:
an outer vessel having an open end and a closed end, and including at least one vent opening; and
an inner vessel having an open end and a closed end and being configured to nest within the outer vessel in releasable engagement therewith;
a vent hole defined in the inner vessel in the region of the closed end thereof;
a valve arrangement operable to open and close the vent hole;
a blade assembly selectively engageable with the open end of the vessel assembly to close off the inner vessel; and
a base selectively engageable with at least one of the vessel assembly and the blade assembly, wherein upon engagement thereof, the valve arrangement is opened such that the vent hole is exposed to atmosphere via the at least one vent opening of the outer vessel and heated air generated during operation of the base and blade assembly may be vented to atmosphere;
wherein upon disengagement of the vessel assembly from the base or blade assembly, the valve arrangement is closed to seal the vent hole such that blended product does not leak from the upright inner vessel; and
in which the inner vessel is configured to engage non-rotatably with the base, and the outer vessel is configured to rotate relative to the base and inner vessel when the inner vessel and the base are so engaged, wherein the outer vessel is rotatable between an engaged position in which the valve arrangement is open and the processor is able to be activated and a disengaged position in which the food processor is deactivated and the valve arrangement is closed.

15. A food processor according to claim 14 wherein an interlock is provided within the base and is configured and located to be activated by the rotation of the outer vessel when in the fully engaged position to allow activation of a motor and to prevent activation of the motor when not fully engaged.

16. A food processor according to claim 14 wherein the inner vessel and the base are complementally splined to prevent relative rotation, and the outer vessel and base are engageable for limited rotation via a bayonet fitting.

17. A food processor according to claim 16 wherein the bayonet fitting is a non-pitched bayonet fitting and the rotation of the outer vessel relative to the base with which it is threadingly engaged causes the inner vessel and blade assembly to separate downwardly and away from the outer vessel.

18. A food processor according to claim 16 wherein the bayonet fitting is a pitched bayonet fitting and the rotation of the outer vessel relative to the base causes the outer vessel to separate upwardly and away from the inner vessel and blade assembly.

19. A food processor according to claim 1 wherein the at least one vent opening in the outer vessel comprises a plurality of vent openings.

* * * * *